US012354536B2

(12) United States Patent
Jeon et al.

(10) Patent No.: US 12,354,536 B2
(45) Date of Patent: Jul. 8, 2025

(54) PIXEL AND DISPLAY DEVICE INCLUDING THE SAME

(71) Applicant: Samsung Display Co., LTD., Yongin-si (KR)

(72) Inventors: Dong Hwan Jeon, Yongin-si (KR); Min Woo Byun, Yongin-si (KR); Min Joo Kim, Yongin-si (KR); Jong Sik Shim, Yongin-si (KR); Seon I Jeong, Yongin-si (KR); Sung Chan Hwang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/744,317

(22) Filed: Jun. 14, 2024

(65) Prior Publication Data

US 2025/0148961 A1 May 8, 2025

(30) Foreign Application Priority Data

Nov. 7, 2023 (KR) ........................ 10-2023-0152814

(51) Int. Cl.
*G09G 3/32* (2016.01)

(52) U.S. Cl.
CPC ....... *G09G 3/32* (2013.01); *G09G 2310/0267* (2013.01); *G09G 2310/0275* (2013.01); *G09G 2320/0233* (2013.01); *G09G 2330/021* (2013.01)

(58) Field of Classification Search
CPC ............. G09G 3/32; G09G 2310/0267; G09G 2310/0275; G09G 2320/0233; G09G 2330/021
See application file for complete search history.

(56) References Cited

U.S. PATENT DOCUMENTS

| | | | | |
|---|---|---|---|---|
| 7,545,354 | B2 | 6/2009 | Ha et al. | |
| 7,788,522 | B1 * | 8/2010 | Abdelaziz | H04L 67/104 709/209 |
| 10,019,946 | B2 | 7/2018 | Choi | |

(Continued)

FOREIGN PATENT DOCUMENTS

| | | | |
|---|---|---|---|
| KR | 10-1130903 | B1 | 3/2012 |
| KR | 10-1830791 | B1 | 2/2018 |

(Continued)

*Primary Examiner* — Andrew Sasinowski

(74) *Attorney, Agent, or Firm* — Womble Bond Dickinson (US) LLP

(57) ABSTRACT

A pixel may include first to third sub-pixels including a first transistor connected to a first power node, a second node, and a first node, a second transistor connected to a data line, the first node, and a first scan line, a third transistor connected to a reference voltage node, the first node, and a second scan line, a fourth transistor connected to a third node, a first initialization voltage node, and a third scan line, a fifth transistor connected to the first power node, the first transistor, and a first emission control line, a sixth transistor connected to the second node, the third node, and a second emission control line, and a first capacitor between the first node and the second node. Any one among reference voltage nodes connected to the first to third sub-pixels may be electrically separated from the other reference voltage nodes.

15 Claims, 8 Drawing Sheets

(56) References Cited

U.S. PATENT DOCUMENTS

| | | | | |
|---|---|---|---|---|
| 11,574,594 | B2 * | 2/2023 | Ka | G09G 3/3291 |
| 11,756,480 | B2 | 9/2023 | Jeong et al. | |
| 12,223,901 | B2 * | 2/2025 | Cho | G09G 3/3233 |
| 2004/0095298 | A1 * | 5/2004 | Miyazawa | G09G 3/3233 345/80 |
| 2009/0281698 | A1 * | 11/2009 | Wilson | F16H 61/0251 701/55 |
| 2013/0063330 | A1 | 3/2013 | Eom | |

FOREIGN PATENT DOCUMENTS

| | | | |
|---|---|---|---|
| KR | 10-2457466 | B1 | 10/2022 |
| KR | 10-2481292 | B1 | 12/2022 |
| KR | 10-2023-0034469 | A | 3/2023 |
| WO | WO 2019/199021 | A1 | 10/2019 |

* cited by examiner

PIXEL AND DISPLAY DEVICE INCLUDING THE SAME

CROSS-REFERENCE TO RELATED APPLICATION

The present application claims priority to, and the benefit of, Korean patent application number 10-2023-0152814, filed on Nov. 7, 2023, in the Korean Intellectual Property Office, the entire disclosure of which is incorporated by reference herein.

BACKGROUND

1. Field

The disclosure relate to a pixel and a display device including the pixel.

2. Description of Related Art

The importance of display devices is increasing with the development of multimedia. Accordingly, various types of display devices, such as an organic light-emitting display (OLED) and a liquid crystal display (LCD), are used.

The display device may display an image using pixels located in a display area. The pixels may be connected to respective scan lines and respective data lines, and each may include a plurality of transistors. For example, a pixel of an active light-emitting display device may include a light-emitting element, a driving transistor, and at least one switching transistor. However, due to the structural limitations of the pixels, design constraints attributable to defects may be caused.

The information disclosed in this background section is only for enhancement of understanding of the background of the described technology, and therefore may contain information that does not form the prior art.

SUMMARY

One or more embodiments of the present disclosure may provide a pixel including a first sub-pixel, a second sub-pixel, and a third sub-pixel, the first, second, and third sub-pixels including a first transistor between a first power node and a second node, and including a gate electrode connected to a first node, a second transistor between a data line and the first node, and including a gate electrode connected to a first scan line, a third transistor between a reference voltage node and the first node, and including a gate electrode connected to a second scan line, a fourth transistor between a third node and a first initialization voltage node, and including a gate electrode connected to a third scan line, a fifth transistor between the first power node and the first transistor, and including a gate electrode connected to a first emission control line, a sixth transistor between the second node and the third node, and including a gate electrode connected to a second emission control line, and a first capacitor between the first node and the second node, wherein one of reference voltage nodes respectively connected to the first, second, and third sub-pixels is electrically separated from another of the reference voltage nodes.

The first, second, and third sub-pixels may further include a seventh transistor between the second node and a second initialization voltage node, and including a gate electrode connected to the third scan line.

The reference voltage nodes may be electrically separated from each other, wherein the reference voltage node of the first sub-pixel is configured to receive a first reference voltage, wherein the reference voltage node of the second sub-pixel is configured to receive a second reference voltage that is different from the first reference voltage, and wherein the reference voltage node of the third sub-pixel is configured to receive a third reference voltage that is different from the first reference voltage and from the second reference voltage.

The first sub-pixel may correspond to red, wherein the second sub-pixel corresponds to green, wherein the third sub-pixel corresponds to blue, and wherein the first reference voltage is higher than the second reference voltage and is higher than the third reference voltage.

The second reference voltage may be higher than the third reference voltage.

The first, second, and third sub-pixels may respectively include second capacitors between the second node and the first power node, and having different respective capacitances.

The reference voltage nodes may be configured to receive preset reference voltages respectively corresponding to the respective capacitances of the second capacitors.

The second capacitor of the first sub-pixel may have a first capacitance, wherein the second capacitor of the second sub-pixel has a second capacitance that is greater than the first capacitance, wherein the second capacitor of the third sub-pixel has a third capacitance that is greater than the second capacitance, and wherein the reference voltage node of the second sub-pixel is configured to receive a second reference voltage that is less than a first reference voltage configured to be received by the reference voltage node of the first sub-pixel, and that is less than a third reference voltage configured to be received by the reference voltage node of the third sub-pixel.

A channel length of the first transistor of the first, second, or third sub-pixels may be different from a channel length of the first transistor of another of the first, second, or third sub-pixels.

The channel length of the first transistor of the first sub-pixel may be a first length, wherein the channel length of the first transistor of the second sub-pixel is a second length that is greater than the first length, wherein the channel length of the first transistor of the third sub-pixel is a third length that is less than the second length, and wherein the reference voltage node of the second sub-pixel is configured to receive a second reference voltage that is lower than a first reference voltage configured to be received by the reference voltage node of the first sub-pixel, and that is lower than a third reference voltage configured to be received by the reference voltage node of the third sub-pixel.

The pixel may further include a third capacitor between the second node and a second power node.

One or more embodiments of the present disclosure may provide a pixel including a first sub-pixel, a second sub-pixel, and a third sub-pixel, the first, second, and third sub-pixels including a first transistor between a first power node and a second node, and including a gate electrode connected to a first node, a second transistor between a data line and the first node, and including a gate electrode connected to a first scan line, a third transistor between a reference voltage node and the first node, and including a gate electrode connected to a second scan line, a fourth transistor between the second node and a first initialization voltage node, and including a gate electrode connected to a third scan line, a fifth transistor between the first power node and the first transistor, and including a gate electrode connected to a first emission control line, and a capacitor between the first node and the second node, wherein one of reference voltage nodes respectively connected to the first, second, and third sub-pixels is electrically separated from another one of the reference voltage nodes.

One or more embodiments of the present disclosure may provide a display device, including pixels that include a first sub-pixel, a second sub-pixel, and a third sub-pixel, a power driver configured to supply voltages to the pixels, a data driver configured to supply a data voltage to a data line, and a scan driver configured to supply scan signals to scan lines, wherein the first, second, and third sub-pixels include a first transistor between a first power node and a second node, and including a gate electrode connected to a first node, a second transistor between the data line and the first node, and including a gate electrode connected to a first scan line among the scan lines, a third transistor between a reference voltage node and the first node, and including a gate electrode connected to a second scan line among the scan lines, a fourth transistor between a third node and a first initialization voltage node, and including a gate electrode connected to a third scan line among the scan lines, a fifth transistor between the first power node and the first transistor, and including a gate electrode connected to a first emission control line, a sixth transistor between the second node and the third node, and including a gate electrode connected to a second emission control line, and a capacitor between the first node and the second node, and wherein one of reference voltage nodes respectively connected to the first, second, and third sub-pixels is electrically separated from another of the reference voltage nodes.

The reference voltage nodes may be electrically separated from each other, wherein the reference voltage node of the first sub-pixel is configured to receive a first reference voltage, wherein the reference voltage node of the second sub-pixel is configured to receive a second reference voltage that is different from the first reference voltage, and wherein the reference voltage node of the third sub-pixel is configured to receive a third reference voltage that is different from the first reference voltage and the second reference voltage.

The first sub-pixel may correspond to red, wherein the second sub-pixel corresponds to green, wherein the third sub-pixel corresponds to blue, and wherein the first reference voltage is higher than the second reference voltage and the third reference voltage.

DETAILED DESCRIPTION

Figure 1:
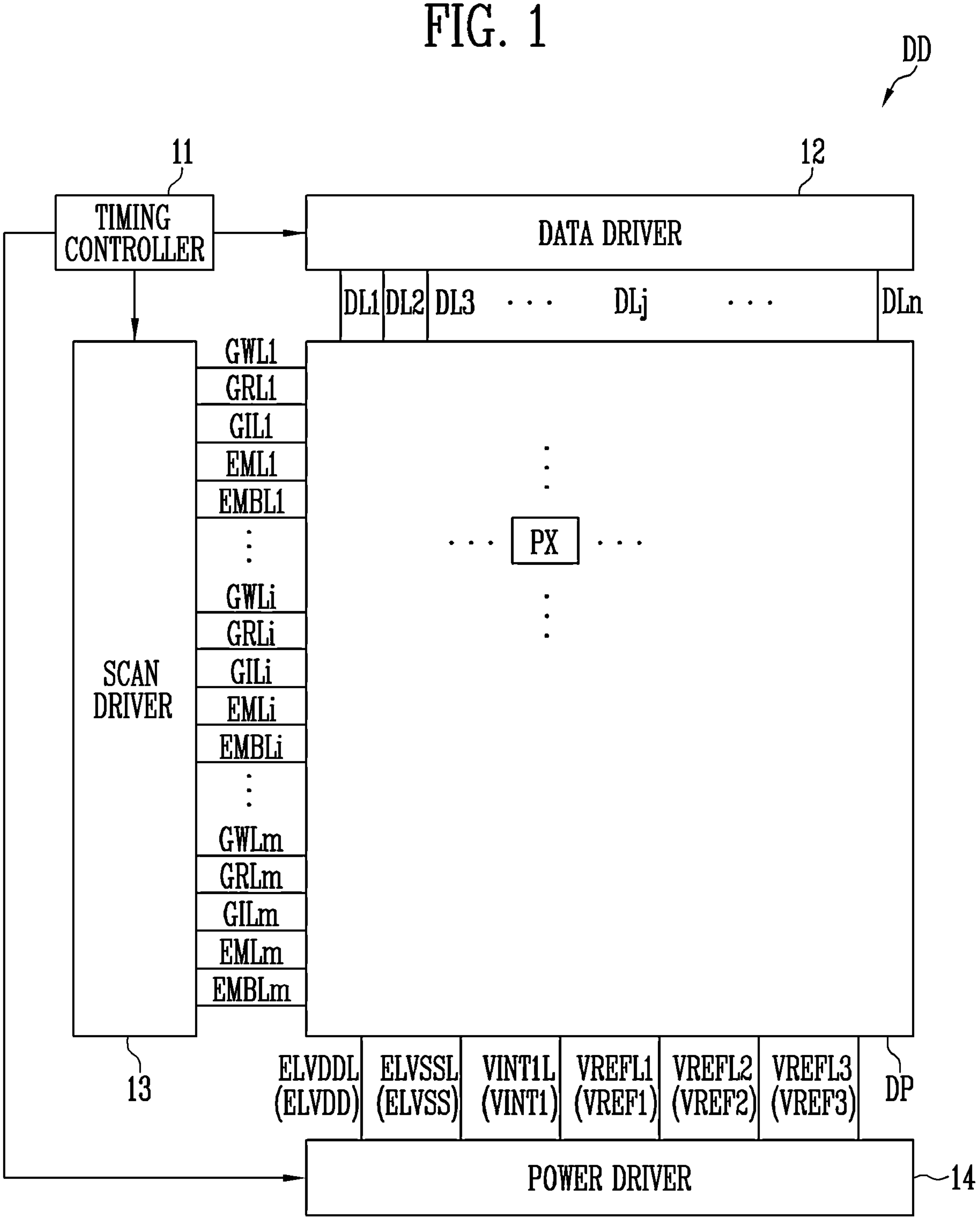
FIG. 1 is a block diagram illustrating a display device in accordance with one or more embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure. The present disclosure covers all modifications, equivalents, and replacements within the idea and technical scope of the present disclosure. Further, each of the features of the various embodiments of the present disclosure may be combined with each other, in part or in whole, and technically various interlocking and driving are possible. Each embodiment may be implemented independently of each other or may be implemented together in an association.

In the drawings, the relative sizes of elements, layers, and regions may be exaggerated for clarity and/or descriptive purposes. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result of, for example, manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of elements, layers, or regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Spatially relative terms, such as "beneath," "below," "lower," "lower side," "under," "above," "upper," "upper side," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a resistor, a capacitor, and/or the like. In describing embodiments, an expression of connection indicates electrical connection unless explicitly described to be direct connection, and "directly connected/directly coupled," or "directly on," refers to one component directly connecting or coupling another component, or being on another component, without an intermediate component.

In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term “substantially,” “about,” “approximately,” and similar terms are used as terms of approximation and not as terms of degree, and are intended to account for the inherent deviations in measured or calculated values that would be recognized by those of ordinary skill in the art. For example, “substantially” may include a range of +/−5% of a corresponding value. “About” or “approximately,” as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, “about” may mean within one or more standard deviations, or within ±30%, 20%, 10%, 5% of the stated value. Further, the use of “may” when describing embodiments of the present disclosure refers to “one or more embodiments of the present disclosure.”

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating a display device DD in accordance with one or more embodiments of the present disclosure.

Referring to FIG. 1, the display device DD may include a display panel DP, a timing controller 11, a data driver 12, a scan driver 13, and a power driver 14.

The display panel DP may include data lines DL1 to DLn (where n is a positive integer), scan lines GWL1 to GWLm, GRL1 to GRLm, and GIL1 to GILm (where m is a positive integer), emission control lines EML1 to EMLm and EMBL1 to EMBLm (where m is a positive integer), and pixels PX.

The pixels PX are arranged on the display panel DP in a row direction and in a column direction. The pixels PX may be electrically connected to the data lines DL1 to DLn, the first scan lines GWL1 to GWLm, the second scan lines GRL1 to GRLm, and the third scan lines GIL1 to GILm. For example, pixels on an i-th row may be connected to a first scan line GWLi on the i-th row among the first scan lines GWL1 to GWLm, connected to a second scan line GRLi on the i-th row among the second scan lines GRL1 to GRLm, and connected to a third scan line GILi on the i-th row among the third scan lines GIL1 to GILm. Pixels on a j-th column may be connected to a j-th data line DLj among the data lines DL1 to DLn. As such, a pixel PXij located on the i-th row and the j-th column may be connected to the scan driver 13 through the first scan line GWLi on the i-th row, the second scan line GRLi on the i-th row, and the third scan line GILi on the i-th row, and may be connected to the data driver 12 through the j-th data line DLj.

Furthermore, the pixels PX may be electrically connected to the first emission control lines EML1 to EMLm and the second emission control lines EMBL1 to EMBLm. For example, the pixels on the i-th row may be connected to a first emission control line EMLi on the i-th row and a second emission control line EMBLi on the i-th row among the second emission control lines EMBL1 to EMBLm.

Each of the pixels PX may include a first sub-pixel SPX1 (refer to FIG. 2) configured to emit light in first color, a second sub-pixel SPX2 (refer to FIG. 2) configured to emit light in second color, and a third sub-pixel SPX3 (refer to FIG. 2) configured to emit light in third color. The first color, the second color, and the third color may be different colors. For example, the first sub-pixel SPX1 may be a pixel related to red, the second sub-pixel SPX2 may be a pixel related to green, and the third sub-pixel SPX3 may be a pixel related to blue. Alternatively, each of the pixels PX may further include a pixel related to white as a fourth sub-pixel.

The timing controller 11 may receive image data (or a frame). The image data may include grayscale values. The grayscale values may include first color grayscale values, second color grayscale values, and third color grayscale values. The first color grayscale values may be grayscale values for expressing the first color. The second color grayscale values may be grayscale values for expressing the second color. The third color grayscale values may be grayscale values for expressing the third color.

Furthermore, the timing controller 11 may receive a control signal for image data. The control signal may include a horizontal synchronization signal, a vertical synchronization signal, and a data enable signal. The vertical synchronization signal may include a plurality of pulses. Based on a time point at which each pulse occurs, a previous frame period may end, and a current frame period may start. A distance between adjacent pulses of the vertical synchronization signal may correspond to one frame period. The horizontal synchronization signal may include a plurality of pulses. Based on a time point at which each pulse occurs, a previous horizontal period may end, and a new horizontal period may start. A distance between adjacent pulses of the horizontal synchronization signal may correspond to one horizontal period. The data enable signal may have an enable level for specific horizontal periods. For example, a data enable signal having an enable level may indicate that color grayscale vales are supplied during the corresponding horizontal periods. The timing controller 11 may control the data driver 12, the scan driver 13, and the power driver 14, in response to the aforementioned control signals.

The timing controller 11 may render or correct image data to meet the specifications of the display device DD, and may provide the processed image data to the data driver 12. Furthermore, the timing controller 11 may provide a clock signal, a scan start signal, and the like to the scan driver 13.

The data driver 12 may operate under the control of the timing controller 11. The data driver 12 may apply data voltages to the data lines DL1 to DLn based on grayscale values of image data received from the timing controller 11. For example, the data driver 12 may sample grayscale values corresponding to each horizontal period using a clock signal, and may apply data voltages corresponding to the sampled grayscale values to the respective data lines DL1 to DLn.

The scan driver 13 may receive a clock signal, a scan start signal, and the like from the timing controller 11, and may generate scan signals to be provided to the first scan lines GWL1 to GWLm, the second scan lines GRL1 to GRLm, and the third scan lines GIL1 to GILm. For example, the scan driver 13 may include a first sub-scan driver connected to the first scan lines GWL1 to GWLm, a second sub-scan driver connected to the second scan lines GRL1 to GRLm, a third sub-scan driver connected to the third scan lines GIL1 to GILm, a fourth sub-scan driver connected to the first emission control lines EML1 to EMLm, and a fifth sub-scan driver connected to the second emission control lines EMBL1 to EMBLm.

For example, the first sub-scan driver may sequentially supply scan signals each having a turn-on level pulse to the first scan lines GWL1 to GWLm. In more detail, the first sub-scan driver may be configured in the form of a shift register. The first sub-scan driver may generate scan signals in such a way as to sequentially transmit a scan start signal having a turn-on level pulse to a subsequent stage circuit under the control of a clock signal. The second to fifth sub-scan drivers may also be implemented in the same manner. Accordingly, redundant explanation thereof is omitted.

Furthermore, the power driver 14 may generate a first power voltage ELVDD, a second power voltage ELVSS, reference voltages VREF1, VREF2, and VREF3, and an initialization voltage VINT1. The power driver 14 may provide the first power voltage ELVDD and the second power voltage ELVSS to the pixels PX through a first power voltage line ELVDDL and a second power voltage line ELVSSL, respectively. Here, the first power voltage ELVDD may be a driving voltage supplied to one electrode of the first transistor T1 (refer to FIG. 2). The second power voltage ELVSS may be a common voltage supplied to a cathode the light-emitting element LD1 (refer to FIG. 2). The first power voltage ELVDD may be higher than the second power voltage ELVSS. Furthermore, the second power voltage ELVSS may be a ground voltage, or may be a voltage that is higher or lower than the ground voltage.

The power driver 14 may provide an initialization voltage VINT1 to the pixels PX through an initialization voltage line VINT1L.

Furthermore, the power driver 14 may provide first to third reference voltages VREF1, VREF2, and VREF3 to the pixels through first to third reference voltage lines VREFL1, VREFL2, and VREFL3. Here, the first to third reference voltages VREF1, VREF2, and VREF3 may be voltages provided to the sub-pixels included in each of the pixels PX.

Figure 2:
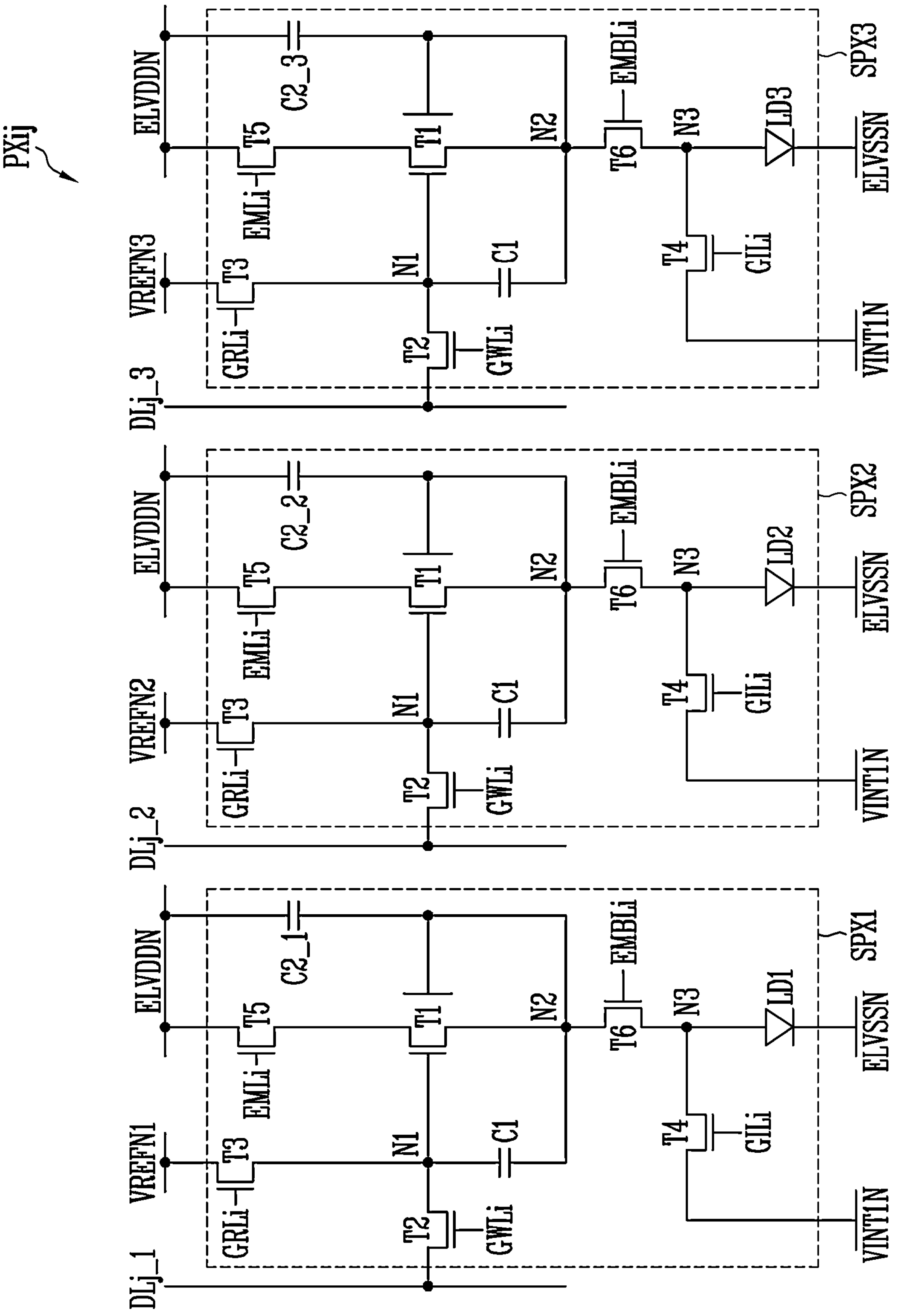
FIG. 2 is a circuit diagram illustrating one or more embodiments of a pixel of FIG. 1.

FIG. 2 is a circuit diagram illustrating one or more embodiments of the pixel PX of FIG. 1.

In FIG. 2, for clear and concise description, there is illustrated the pixel PXij located on the i-th row and the j-th column. However, the foregoing is illustrative, and pixels located on other rows and/or other columns may have substantially the same configuration as the pixel PXij, other than the fact that each of the pixels is connected to signal lines corresponding to the associated row and column.

Referring to FIG. 2, the pixel PXij may include a first sub-pixel SPX1, a second sub-pixel SPX2, and a third sub-pixel SPX3.

The first sub-pixel SPX1, the second sub-pixel SPX2, and the third sub-pixel SPX3 may be connected to the first scan line GWLi on the i-th row, the second scan line GRLi on the i-th row, and the third scan line GILi on the i-th row.

The first sub-pixel SPX1, the second sub-pixel SPX2, and the third sub-pixel SPX3 are respectively connected to data lines DLj_1, DLj_2, and DLj_3. The data lines DLj_1, DLj_2, and DLj_3 may be included in the j-th data line DLj of FIG. 1.

The first sub-pixel SPX1 may include transistors T1, T2, T3, T4, T5, and T6, a first capacitor C1, a second capacitor C2_1, and a light-emitting element LD1. Each of the second sub-pixel SPX2 and the third sub-pixel SPX3, except for the second capacitors C2_2 and C2_3, and the connected data lines DLj_2 and DLj_3 and reference voltage nodes VREFN2 and VREFN3, may have the same configuration as the first sub-pixel SPX1. Therefore, hereinbelow, the first sub-pixel SPX1 will be described as a representative example.

Each of the transistors T1, T2, T3, T4, T5, and T6 may be configured in various forms, such as a thin film transistor (TFT), a field effect transistor (FET), and a bipolar junction transistor (BJT). Hereinafter, the case where each of the transistors T1, T2, T3, T4, T5, and T6 is configured of an N-type thin-film transistor will be explained as a representative example. However, one or more of the transistors T1, T2, T3, T4, T5, and T6 may be a P-type thin-film transistor, and is not limited thereto.

The first transistor T1 may include a first gate electrode connected to a first node N1, and may be connected between a first power node ELVDDN and a second node N2. A second gate electrode of the first transistor T1 may be provided to adjust characteristics of output current relative to input voltage of the first transistor T1. For example, the first transistor T1 may primarily operate in a saturation state. Here, the characteristics of the first transistor T1 may be adjusted to be insensitive to changes in drain-source voltage by the second gate electrode. The first transistor T1 may control the amount of driving current flowing from the first power node ELVDDN to the second power node ELVSSN. Therefore, the first transistor T1 may be referred to as "driving transistor."

The second transistor T2 may include a gate electrode connected to the first scan line GWLi, and may be connected between a data line DLj_1 and the first node N1. The second transistor T2 may receive a data voltage applied to the data line DLj_1. Therefore, the second transistor T2 may be referred to as "data writing transistor."

The third transistor T3 may include a gate electrode connected to the second scan line GRLi, and may be connected between a first reference voltage node VREFN1 and the first node N1. The third transistor T3 may apply a first reference voltage VREF1 to the first node N1 to initialize the voltage of the first node N1 to the first reference voltage VREF1. Therefore, the third transistor T3 may be referred to as "first initialization transistor." Furthermore, the third transistor T3 may apply the first reference voltage VREF1 to one electrode of the first capacitor C1.

In embodiments, the first to third reference voltage nodes VREFN1, VREFN2, and VREFN3 connected to the third transistor T3 may be separated from each other by the sub-pixels. For example, the first reference voltage node VREFN1 may be connected to the third transistor T3 included in the first sub-pixel SPX1. The second reference voltage node VREFN2 may be connected to the third transistor T3 included in the second sub-pixel SPX2. The third reference voltage node VREFN3 may be connected to the third transistor T3 included in the third sub-pixel SPX3.

The preset first to third reference voltages VREF1, VREF2, and VREF3 may be applied to the first to third reference voltage nodes VREFN1, VREFN2, and VREFN3. For example, the first reference voltage VREF1 may be applied to the first reference voltage node VREFN1 of the first sub-pixel SPX1. The second reference voltage VREF2 may be applied to the second reference voltage node VREFN2 of the second sub-pixel SPX2. The third reference voltage VREF3 may be applied to the third reference voltage node VREFN3 of the third sub-pixel SPX3.

The fourth transistor T4 may include a gate electrode connected to the third scan line GILi, and may be connected between a third node N3 and a first initialization voltage node VINT1N. The fourth transistor T4 may apply a first initialization voltage VINT1 to the third node N3 to initialize the voltage of the third node N3 to the first initialization voltage VINT1. Therefore, the fourth transistor T4 may be referred to as "second initialization transistor."

The fifth transistor T5 may include a gate electrode connected to the first emission control line EMLi, and may be connected between the first power node ELVDDN and the first transistor T1. The fifth transistor T5 may control opening and closing of a driving current path connecting the first power node ELVDDN to the second power node ELVSSN. The fifth transistor T5 may be referred to as "first emission control transistor."

The sixth transistor T6 may include a gate electrode connected to the second emission control line EMBLi, and may be connected between the second node N2 and the third node N3. The sixth transistor T6 may control opening and closing of a driving current path connecting the first power node ELVDDN to the second power node ELVSSN. The sixth transistor T6 may be referred to as "second emission control transistor."

The first capacitor C1 may be connected between the first node N1 and the second node N2. The first capacitor C1 may store and maintain a voltage value corresponding to a difference between voltages applied to the opposite electrodes thereof.

The second capacitor C2_1 may be connected between the second node N2 and the first power node ELVDDN. For example, as the voltage of the first node N1 connected to one electrode of the first capacitor C1 changes from the first reference voltage VREF1 to a data voltage VData, the voltage of the second node N2 connected to one electrode of the second capacitor C2_1 may be changed.

The light-emitting diode LD1 may include an anode connected to the third node N3, and a cathode connected to the second power node ELVSSN. The light-emitting element LD1 may be a light-emitting diode. The light-emitting element LD1 may be formed of an organic light-emitting diode, an inorganic light-emitting diode, a quantum dot/well light-emitting diode, or the like.

In embodiments, each of the first to third sub-pixels SPX1, SPX2, and SPX3 may include one light-emitting element. For example, the first sub-pixel SPX1 may include a first light-emitting element LD1 configured to emit light in the first color. The second sub-pixel SPX2 may include a second light-emitting element LD2 configured to emit light in the second color. The third sub-pixel SPX3 may include a third light-emitting element LD3 configured to emit light in the third color.

The first power node ELVDDN, the second power node ELVSSN, the first initialization voltage node VINT1N, and the first to third reference voltage nodes VREFN1, VREFN2, and VREFN3 may be electrically connected to the first power voltage line ELVDDL, the second power voltage line ELVSSL, the initialization voltage line VINT1L, and the first to third reference voltage lines VREFL1, VREFL2, and VREFL3, respectively.

Figure 3A:
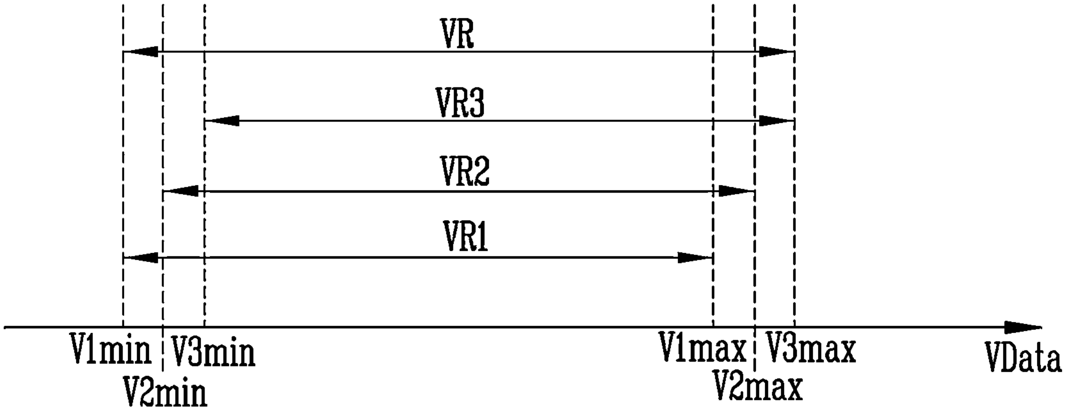
FIGS. 3A and 3B are diagrams illustrating embodiments of ranges of data voltages to be applied to sub-pixels of FIG. 2.
Figure 3B:
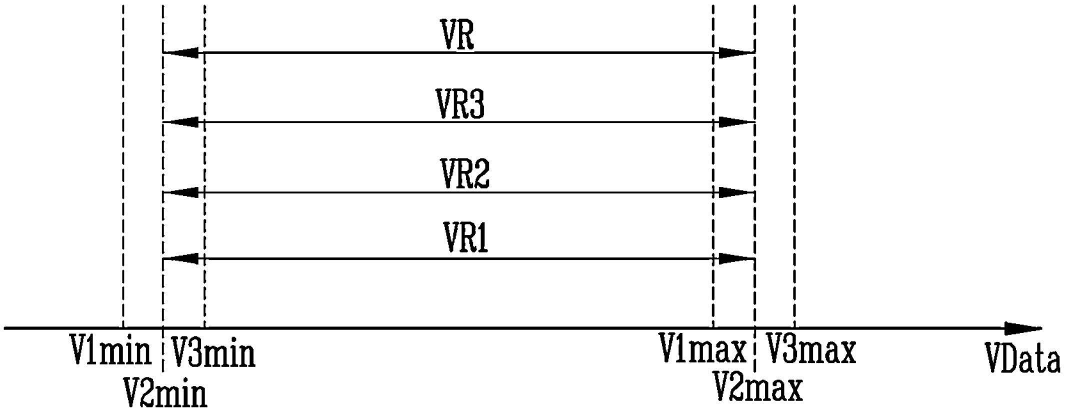

FIGS. 3A and 3B are diagrams illustrating embodiments of ranges of data voltages to be applied to the sub-pixels of FIG. 2.

Referring to FIGS. 1, 3A, and 3B, the data voltage VData may be provided from the data driver 12 to the pixels PX through the data lines DL1 to DLn.

Each of the first to third sub-pixels SPX1, SPX2, and SPX3 (refer to FIG. 2) included in the pixels PX may emit light at luminance corresponding to the magnitude of driving current IDS flowing through the first transistor T1. To compensate for differences in electrical characteristics between the first to third sub-pixels SPX1, SPX2, and SPX3, the magnitudes of the driving current IDS for the first to third sub-pixels SPX1, SPX2, and SPX3 may differ from each other. The driving current IDS is given by the following equation.

$$I_{DS} = k(V_{gs} - V_{th})^2 = k\left(\frac{C_{HOLD}}{C_{DS} + C_{HOLD}}\right)^2 (V_{DATA} - V_{REF})^2 \qquad \text{Equation 1}$$

Here, CHOLD may correspond to the second capacitor C2_1, and CDS may correspond to the first capacitor C1. Here, K is a constant based on the characteristics of the first transistor T1, where K=μ·Ci·W/L, μ may denote field-effect mobility, Ci may denote capacitance of the gate insulating layer, W may denote a channel width, and L may be a channel length.

In other words, the driving current IDS provided to compensate for differences in electrical characteristics between the first to third sub-pixels SPX1, SPX2, and SPX3 may be adjusted by the data voltage VData and the reference voltage VREF.

In one or more embodiments, each of the first to third sub-pixels SPX1, SPX2, and SPX3 may be designed, accounting for the differences in electrical characteristics. For example, in the case where the first to third sub-pixels SPX1, SPX2, and SPX3 respectively correspond to red, green, and blue, the design of the first sub-pixel SPX1 may take into account black luminance, the design of the second sub-pixel SPX2 may take into account an overall panel mura phenomenon, and the design of the third sub-pixel SPX3 may take into account white luminance. Accordingly, the driving current IDS flowing through the first sub-pixel SPX1 may be required to be lower than the driving current IDS flowing through the second sub-pixel SPX2. The driving current IDS flowing the second sub-pixel SPX2 may be required to be lower than the driving current IDS flowing through the third sub-pixel SPX3.

Referring to FIG. 3A, in the case where the same reference voltage VREF is applied to the first to third sub-pixels SPX1, SPX2, and SPX3, data voltages VData in different data voltage ranges may be respectively applied to the first to third sub-pixels SPX1, SPX2, and SPX3, thus allowing implementation of white luminance (or brightest luminance) and black luminance (or darkness/darkest luminance). For example, the reference voltage VREF applied to the first to third sub-pixels SPX1, SPX2, and SPX3 may be the same at about 1.8 V. However, embodiments are not limited to the aforementioned example.

Hereinafter, the data voltage VData provided to implement the white luminance is referred to as "white voltage," and the data voltage Vdata provided to implement the black luminance is referred to as "black voltage."

For example, the first sub-pixel SPX1 among the first to third sub-pixels SPX1, SPX2, and SPX3 may implement the white luminance and the black luminance in a lowest first data voltage range VR1. The second sub-pixel SPX2 among the first to third sub-pixels SPX1, SPX2, and SPX3 may implement the white luminance and the black luminance in a second data voltage range VR2 that is higher than the first data voltage range VR1. The third sub-pixel SPX3 among the first to third sub-pixels SPX1, SPX2, and SPX3 may implement the white luminance and the black luminance in a third data voltage range VR3 that is higher than the second data voltage range VR2. The first to third data voltage ranges VR1, VR2, and VR3 may overlap each other.

The first data voltage range VR1 for the first sub-pixel SPX1 may be lower than each of the second data voltage range VR2 for the second sub-pixel SPX2 and the third data voltage range VR3 for the third sub-pixel SPX3. For example, the first data voltage range VR1 may range from a first minimum data voltage $V1min$ to a first maximum data voltage $V1max$. The second data voltage range VR2 may range from a second minimum data voltage $V2min$ to a second maximum data voltage $V2max$. Here, the first minimum data voltage $V1min$ may have a voltage level that is lower than the second minimum data voltage $V2min$.

The third data voltage range VR3 for the third sub-pixel SPX3 may be higher than each of the first data voltage range VR1 for the first sub-pixel SPX1 and the second data voltage range VR2 for the second sub-pixel SPX2. For example, the third data voltage range VR3 may range from a third minimum data voltage $V3min$ to a third maximum data voltage $V3max$. Here, the third maximum data voltage $V3max$ may have a voltage level that is higher than the second maximum data voltage $V2max$.

Accordingly, the data voltage range VR of the data voltage VData applied to the first to third sub-pixels SPX1, SPX2, and SPX3 may be large enough to cover the entire range from the white voltage to the black voltage of the first to third sub-pixels SPX1, SPX2, and SPX3. This may imply that relatively high power consumption is required to generate the data voltage VData.

In one or more embodiments, the first to third reference voltage nodes VREFN1, VREFN2, and VREFN3 that are electrically separated from each other may be respectively connected to the first to third sub-pixels SPX1, SPX2, and SPX3. The first to third sub-pixels SPX1, SPX2, and SPX3 may be supplied with the first to third reference voltages VREF1, VREF2, and VREF3 having different voltage levels through the first to third reference voltage nodes VREFN1, VREFN2, and VREFN3.

Referring to FIG. 3B, in the case where the first to third reference voltage VREF1, VREF2, and VREF3 respectively applied to the first to third sub-pixels SPX1, SPX2, and SPX3 are different from each other, the first to third sub-pixels SPX1, SPX2, and SPX3 may implement white luminance and black luminance even when the data voltage VData in the same data voltage range VR is applied to the first to third sub-pixels SPX1, SPX2, and SPX3.

For example, the first reference voltage VREF1 may be applied through the first reference voltage node VREFN1 connected to the first sub-pixel SPX1. The second reference voltage VREF2 may be applied through the second reference voltage node VREFN2 connected to the second sub-pixel SPX2. The third reference voltage VREF3 may be applied through the third reference voltage node VREFN3 connected to the third sub-pixel SPX3. Here, the first reference voltage VREF1 may have a voltage level that is higher than the second reference voltage VREF2. The second reference voltage VREF2 may have a voltage level that is higher than the third reference voltage VREF3.

In detail, for example, the first reference voltage VREF1 may be about 1.9 V, and the third reference voltage VREF3 may be about 1.7 V. The second reference voltage VREF2 may be about 1.8 V. However, this is only for illustrative purposes, and embodiments are not limited thereto.

For example, the first sub-pixel SPX1 among the first to third sub-pixels SPX1, SPX2, and SPX3 may implement the white luminance and the black luminance in the first data voltage range VR1. The second sub-pixel SPX2 among the first to third sub-pixels SPX1, SPX2, and SPX3 may implement the white luminance and the black luminance in the second data voltage range VR2. The third sub-pixel SPX3 among the first to third sub-pixels SPX1, SPX2, and SPX3 may implement the white luminance and the black luminance in the third data voltage range VR3. Here, the first to third data voltage ranges VR1, VR2, and VR3 may be substantially the same data voltage range VR.

As such, if the first to third reference voltages VREF1, VREF2, and VREF3 having different respective voltage levels are respectively applied to the first to third sub-pixels SPX1, SPX2, and SPX3, the same data voltage range VR may cover a range from the white voltage to the black voltage of the first to third sub-pixels SPX1, SPX2, and SPX3. Accordingly, relatively low power consumption may be required to generate the data voltage VData.

Therefore, the present disclosure may provide pixels PX that require relatively low power consumption for generating the data voltage VData while compensating for differences in electrical characteristics between the first to third sub-pixels SPX1, SPX2, and SPX3.

In embodiments, because the first to third reference voltage nodes VREFN1, VREFN2, and VREFN3 connected to the third transistor T3 may be separated from each other by the sub-pixels, the capacitance of the respective second capacitors C2_1, C2_2, and C2_3 may be adjusted, thus improving image quality.

For example, the second sub-pixel SPX2 may reduce the capacitance of the second capacitor C2_2, thereby mitigating the mura phenomenon. In the second sub-pixel SPX2, as the capacitance of the second capacitor C2_2 is reduced, the driving current flowing through the first transistor T1 may be reduced. Accordingly, to maintain the driving current of the first transistor T1 and implement target luminance, the second reference voltage VREF2 applied to the second sub-pixel SPX2 may be adjusted to a low voltage level.

Referring to FIGS. 2, 3A, and 3B, the capacitance of the second capacitor C2_1 connected to the first sub-pixel SPX1 may be less than each of the capacitance of the second capacitor C2_2 connected to the second sub-pixel SPX2 and the capacitance of the second capacitor C2_3 connected to the third sub-pixel SPX3. In this case, the second reference voltage VREF2 applied to the second sub-pixel SPX2 may have a voltage level that is less than each of the first reference voltage VREF1 applied to the first sub-pixel SPX1 and the third reference voltage VREF3 applied to the third sub-pixel SPX3.

For example, the capacitance of the second capacitor C2_1 connected to the first sub-pixel SPX1 may be about 68 fF. The capacitance of the second capacitor C2_3 connected to the third sub-pixel SPX3 may be about 204 fF. The capacitance of the second capacitor C2_2 connected to the second sub-pixel SPX2 may be adjusted from about 109 fF to about 80 fF. Hence, the second reference voltage VREF2 may be adjusted from about 1.8 V to about 1.6 V. However, embodiments are not limited to the aforementioned example.

As such, even when it is suitable to change the capacitance of the second capacitor for image quality improvement, the driving current can be controlled by adjusting (e.g., differentially) the first to third reference voltages VREF1, VREF2, and VREF3. In other words, luminance degradation resulting from changes in the capacitance of the second capacitor can be reduced or prevented by applying the first to third reference voltages VREF1, VREF2, and VREF3 having different voltage levels to the first to third sub-pixels SPX1, SPX2, and SPX3, respectively.

Figure 4:
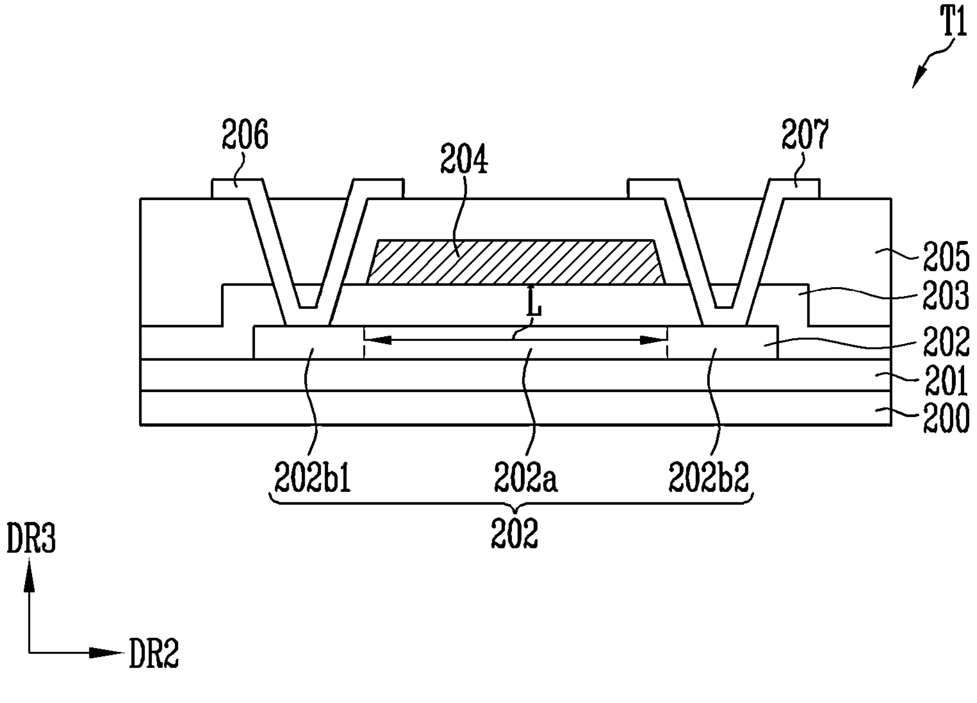
FIG. 4 is a sectional view of a first transistor included in any one of the sub-pixels of FIG. 2.

FIG. 4 is a sectional view of the first transistor T1 included in any one of the sub-pixels of FIG. 2.

Referring to FIGS. 3A, 3B, and 4, a channel length L of the first transistor T1 may influence lifespan and luminance.

As illustrated in FIG. 4, the first transistor T1 may be located on one surface of a buffer layer 201 above a base layer 200. The first transistor T1 may include an active layer 202. The active layer 202 may include a channel area 202*a* provided to form a channel, and a first area 202*b*1 and a second area 202*b*2 respectively located on opposite sides of the channel area 202*a*. The first transistor T1 may include a gate electrode 204 that is spaced apart from the active layer 202 by a first insulating layer 203, and overlaps the channel area 202*a*. The first transistor T1 may include a first electrode 206 and a second electrode 207 that are spaced apart from the active layer 202 by the first insulating layer 203 and by a second insulating layer 205, and that are respectively connected to the first area 202*b*1 and the second area 202*b*2.

Here, the channel length L of the first transistor T1 may be a length of the channel area 202*a* with respect to a second direction DR2 passing through the first area 202*b*1 and the second area 202*b*2 of the active layer 202.

As different reference voltages VREF1, VREF2, and VREF3 are applied to the respective sub-pixels SPX1, SPX2, and SPX3, the channel length L of the first transistor T1 may be designed to vary for the respective sub-pixels SPX1, SPX2, and SPX3. Detailed description pertaining to the channel length L of the first transistor T1 that differs for the respective sub-pixels SPX1, SPX2, and SPX3 will be made below, with reference to FIG. 5.

Figure 5:
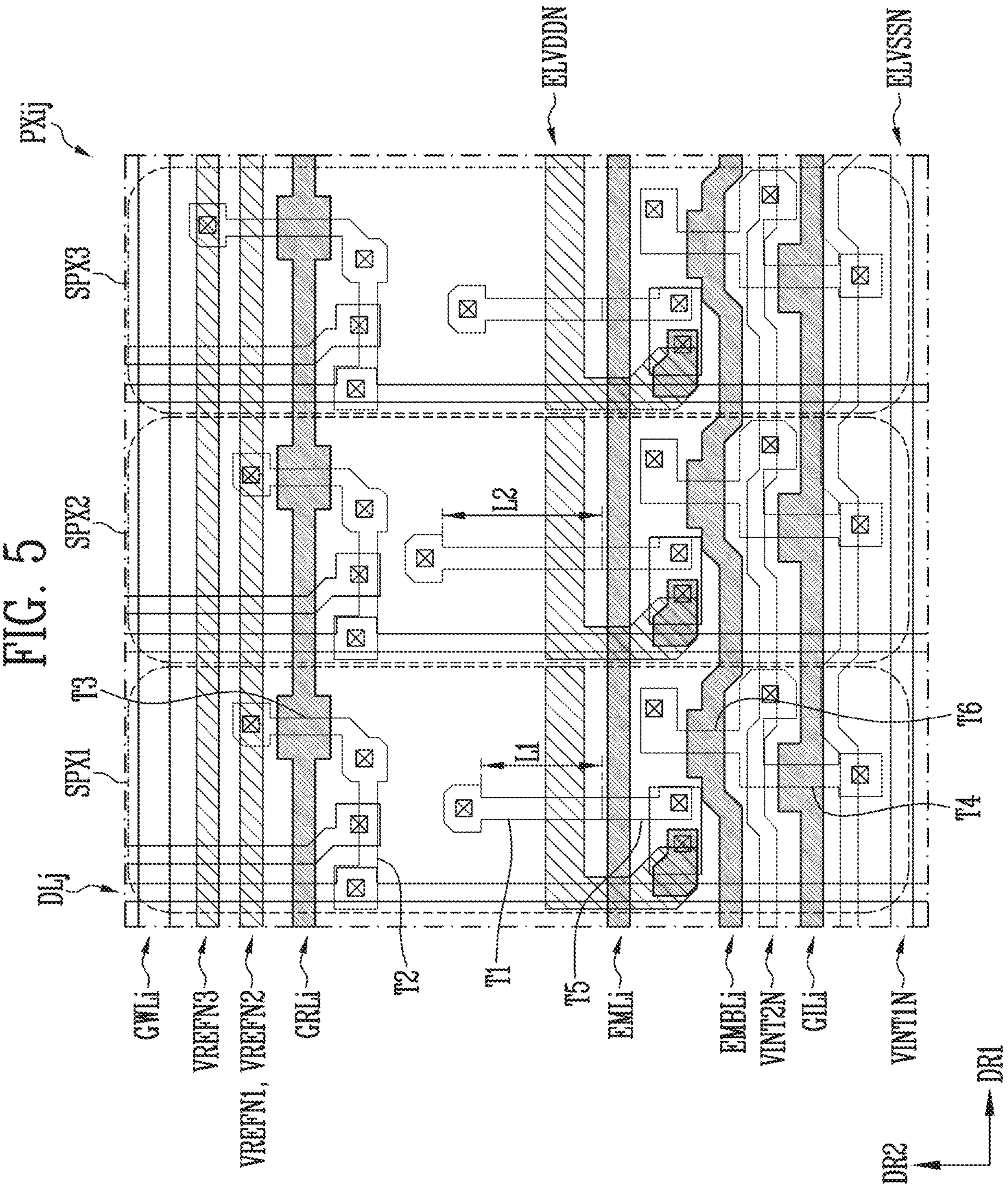
FIG. 5 is a plan view illustrating one or more embodiments of a layout of a pixel of FIG. 1.

FIG. 5 is a plan view illustrating one or more embodiments of the layout of the pixel of FIG. 1.

Referring to FIGS. 2 and 5, the third reference voltage node VREFN3 connected to the third sub-pixel SPX3 among the first to third sub-pixels SPX1, SPX2, and SPX3 may be electrically isolated from the first reference voltage node VREFN1 connected to the first sub-pixel SPX1, and from the second reference voltage node VREFN2 connected to the second sub-pixel SPX2. However, although in FIG. 5 there is illustrated the case where the third reference voltage node VREFN3 among the first to third reference voltage nodes VREFN1, VREFN2, and VREFN3 is electrically isolated, all of the first to third reference voltage nodes VREFN1, VREFN2, and VREFN3 may be electrically isolated.

Referring to FIG. 5, the channel length L of the first transistor T1 may be adjusted to improve the lifespan and color based on the characteristics of the first transistor T1. For example, in the case where improvement of the lifespan of the first transistor T1 included the second sub-pixel SPX2 among the first to third sub-pixels SPX1, SPX2, and SPX3 is suitable, a channel length L2 of the first transistor T1 included in the second sub-pixel SPX2 may be increased.

Here, the channel length L2 of the first transistor T1 included in the second sub-pixel SPX2 may be greater than the channel length L1 of the first transistor T1 included in the first sub-pixel SPX1. Likewise, the channel length L2 of the first transistor T1 included in the second sub-pixel SPX2 may be greater than the channel length of the first transistor T1 included in the third sub-pixel SPX3. However, although in FIG. 5 there is illustrated the case where the channel length of the first transistor T1 included in the third sub-pixel SPX3 is substantially the same as the channel length L1 of the first transistor T1 included in the first sub-pixel SPX1, other embodiments are not limited thereto.

In another example, in the case where there is a desire to improve the decreasing luminance due to the degradation of the second light-emitting element LD2 included in the second sub-pixel SPX2 among the first to third sub-pixels SPX1, SPX2, and SPX3, the channel length L2 of the first transistor T1 included in the second sub-pixel SPX2 may increase. In this case, even if the lifespan of the first transistor T1 in the second sub-pixel SPX2 remains the same, the luminance may decrease as the second light-emitting element L2 degrades and as the driving voltage increases. Accordingly, to improve the decreasing luminance, the channel length L2 of the first transistor T1 included in the second sub-pixel SPX2 may increase.

As the channel length L2 of the first transistor T1 included in the second sub-pixel SPX2 increases, the driving current flowing through the first transistor T1 of the second sub-pixel SPX2 may be reduced. As the driving current decreases, the luminance of the second sub-pixel SPX2 may be reduced. Accordingly, to maintain the driving current of the first transistor T1 and to implement target luminance, the second reference voltage VREF2 applied to the second sub-pixel SPX2 may be adjusted to a low voltage level. In other words, the second reference voltage VREF2 applied to the second sub-pixel SPX2 may have a voltage level that is lower than the first reference voltage VREF1 applied to the first sub-pixel SPX1.

Furthermore, the channel length of the first transistor T1 included in the third sub-pixel SPX3 may be greater than the channel length L1 of the first transistor T1 included in the first sub-pixel SPX1. In this case, the third reference voltage VREF3 applied the third sub-pixel SPX3 may have a voltage level that is lower than the first reference voltage VREF1 applied to the first sub-pixel SPX1.

For example, the channel length L1 of the first transistor T1 included in the first sub-pixel SPX1 may be about 10 μm. The channel length of the first transistor T1 included in the third sub-pixel SPX3 may be about 15 μm. The channel length L2 of the first transistor T1 included in the second sub-pixel SPX2 may be about 20 μm. However, embodiments are not limited to the aforementioned example.

As such, even in cases where it is suitable to change the channel length for lifespan improvement and related color afterimage mitigation, the driving current can be controlled by adjusting differentially the first to third reference voltages VREF1, VREF2, and VREF3. In other words, luminance degradation resulting from changes in the channel length can be reduced or prevented by applying the first to third reference voltages VREF1, VREF2, and VREF3 having different voltage levels to the first to third sub-pixels SPX1, SPX2, and SPX3, respectively.

Based on the data voltage range described with reference to FIGS. 3A and 3B, the first reference voltage VREF1 of the first sub-pixel SPX1 has been described as being higher than the second reference voltage VREF2 of the second sub-pixel SPX2, and the second reference voltage VREF2 of the second sub-pixel SPX2 has been described as being higher than the third reference voltage VREF3 of the third sub-pixel SPX3. Here, with regard to the first to third reference voltages VREF1, VREF2, and VREF3 of the first to third sub-pixels SPX1, SPX2, and SPX3, based on the second capacitor described with reference to FIGS. 3A and 3B and/or the channel length described with reference to FIG. 5, at least one of the first to third reference voltages VREF1, VREF2, and VREF3 may be adjusted.

For example, the second reference voltage VREF2 of the second sub-pixel SPX2 may decrease to a low voltage level. For example, the second reference voltage VREF2 may be adjusted within a range from about 1.1V to about 2.1V. Hence, the first reference voltage VREF1 of the first sub-pixel SPX1 may have a voltage level that is higher than the third reference voltage VREF3 of the third sub-pixel SPX3. The third reference voltage VREF3 of the third sub-pixel SPX3 may have a voltage level that is higher than the second reference voltage VREF2 of the second sub-pixel SPX2.

Figure 6A:
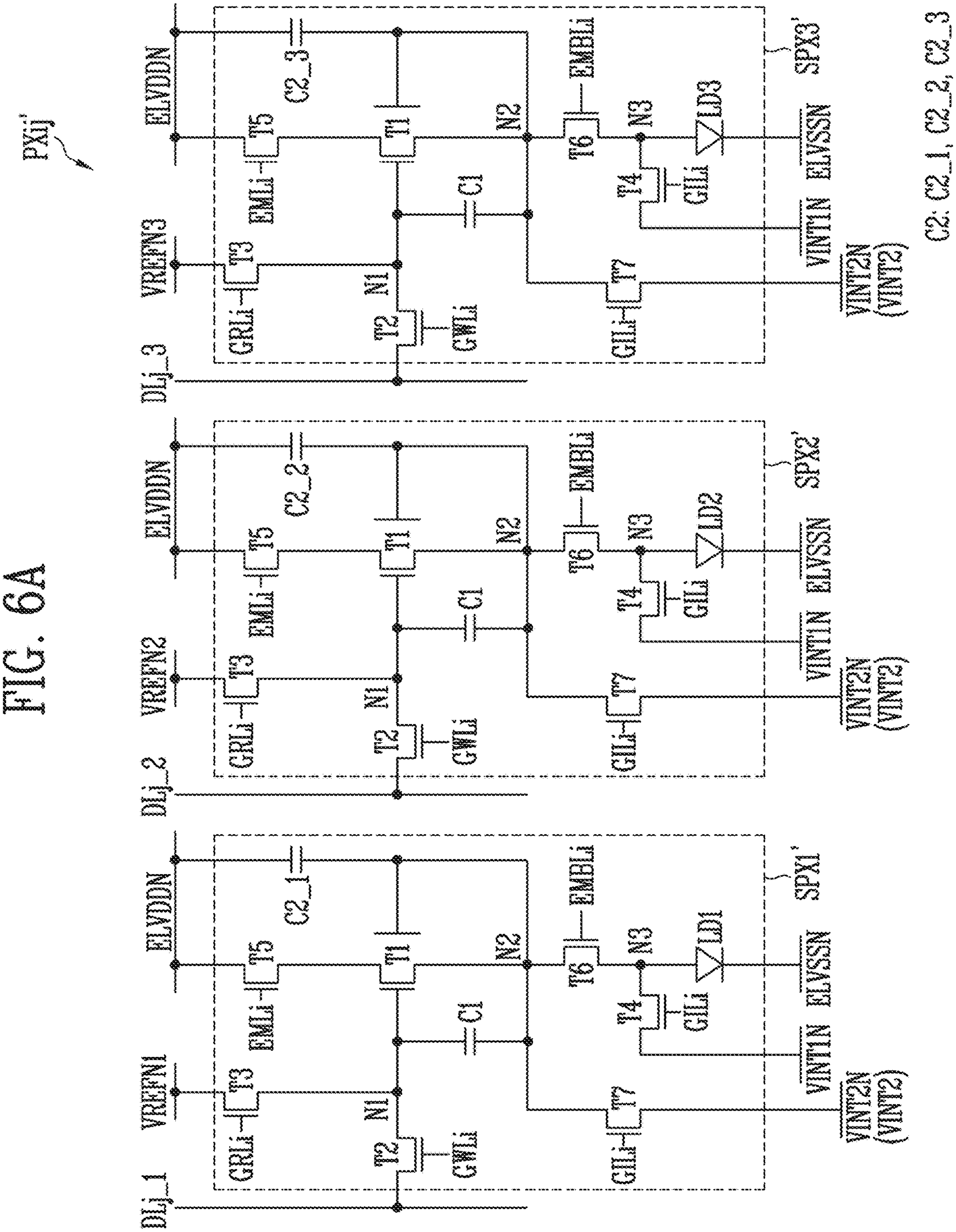
FIGS. 6A, 6B, and 6C are circuit diagrams illustrating other embodiments of the pixel of FIG. 1.
Figure 6B:
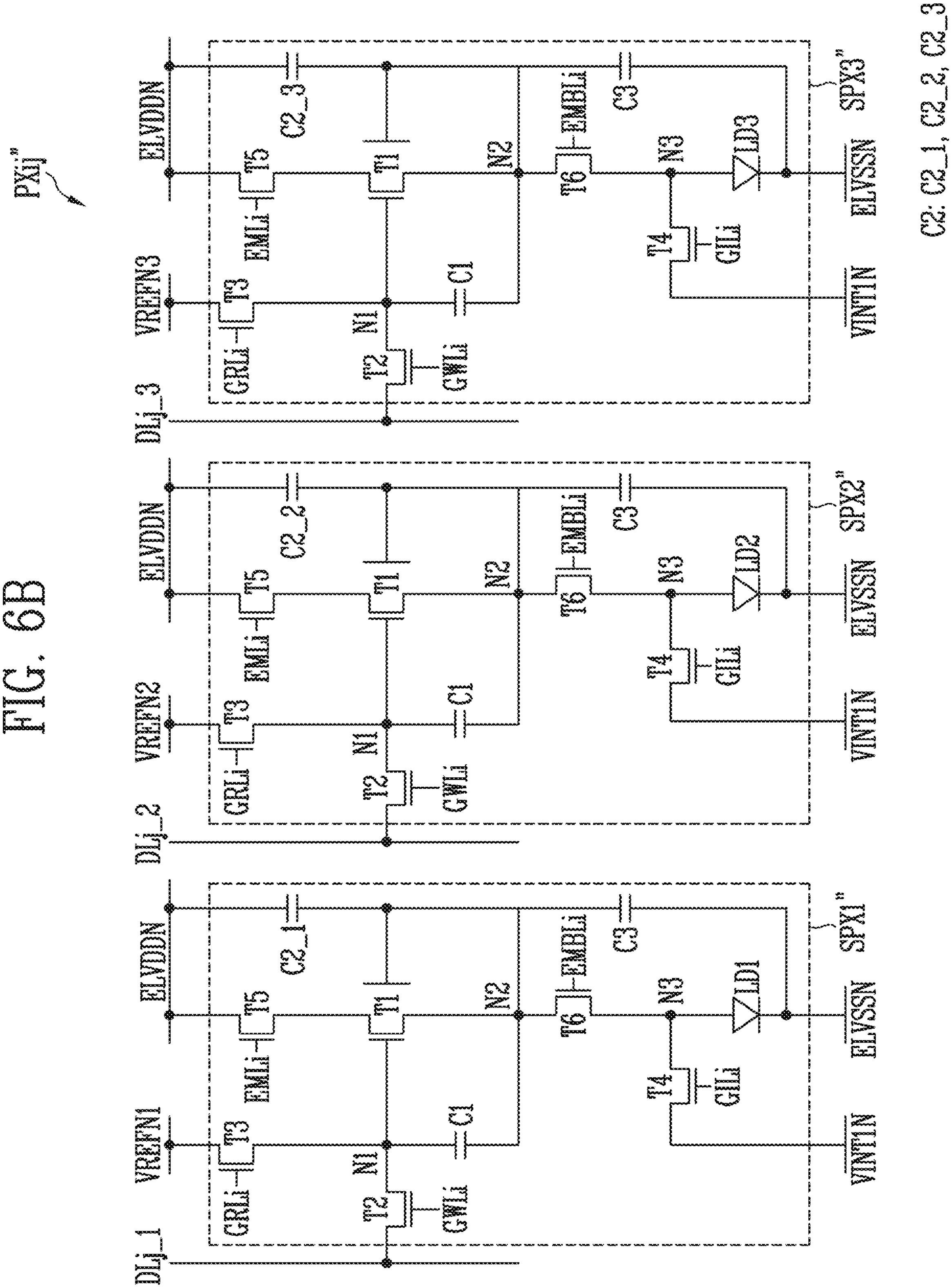
Figure 6C:
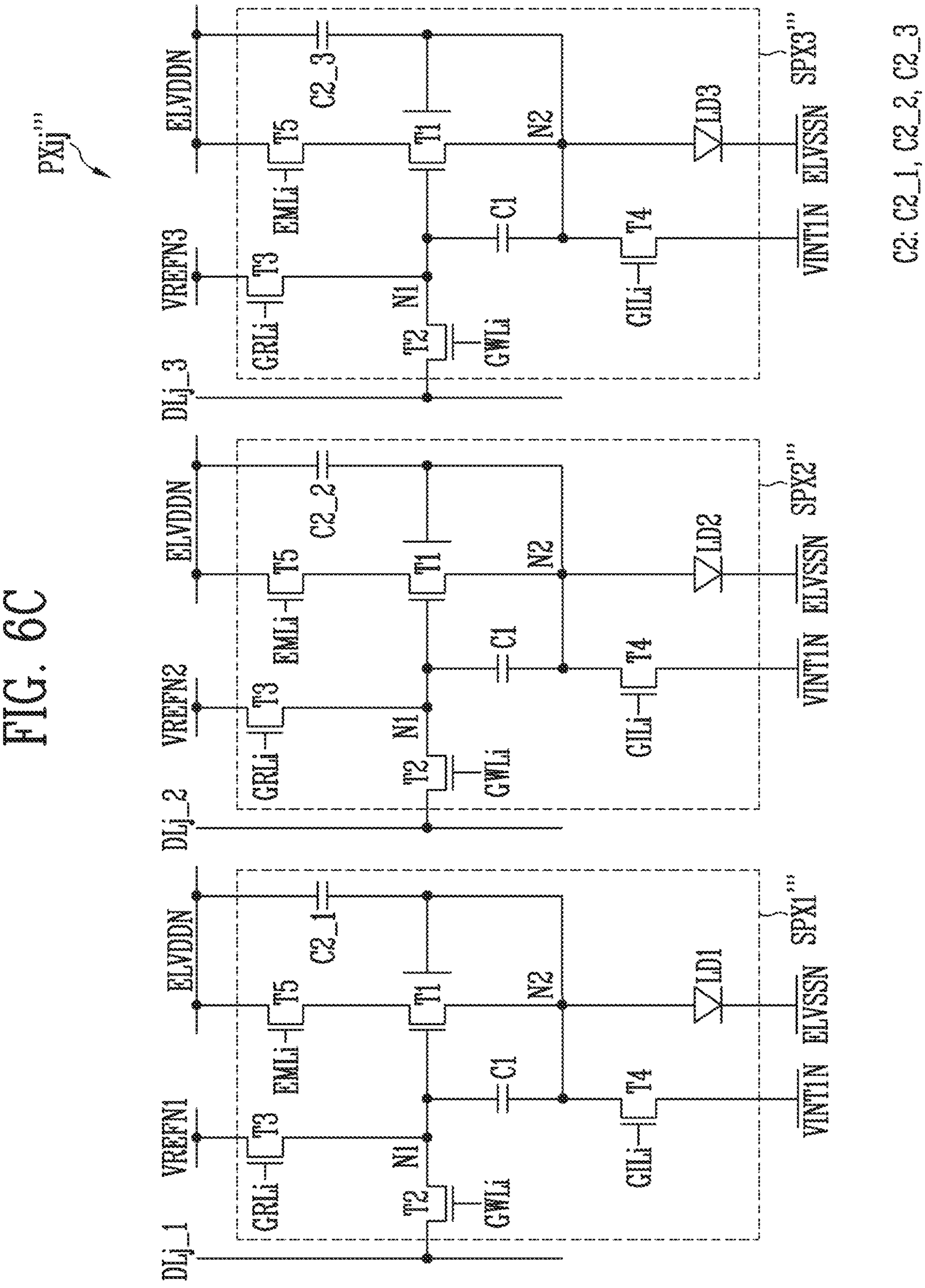

FIGS. 6A, 6B, and 6C are circuit diagrams illustrating other embodiments of the pixel of FIG. 1.

First to third sub-pixels SPX1', SPX2', and SPX3' included in a pixel PXij' may have substantially the same configuration. Therefore, hereinbelow, the first sub-pixel SPX1' will be described as a representative example.

Each of the first to third sub-pixels SPX1', SPX2', and SPX3' may include seven transistors T1, T2, T3, T4, T5, T6, and T7 and two capacitors C1 and C2 (e.g., C2_1, C2_2, or C2_3).

Referring to FIGS. 2 and 6A, the first to third sub-pixels SPX1', SPX2', and SPX3' of FIG. 6A, except a seventh transistor T7, may be substantially the same as the first to third sub-pixels SPX1, SPX2, and SPX3 of FIG. 2. Therefore, redundant explanations will be omitted.

The seventh transistor T7 may include a gate electrode connected to the third scan line GILi, and may be connected between the second node N2 and a second initialization voltage node VINT2N. The seventh transistor T7 may apply a second initialization voltage VINT2 to the second node N2, thus initializing the voltage of the second node N2 to the second initialization voltage VINT2. Therefore, the seventh transistor T7 may be referred to as "third initialization transistor."

First to third sub-pixels SPX1", SPX2", and SPX3" included in a pixel PXij" illustrated in FIG. 6B each may include six transistors T1, T2, T3, T4, T5, and T6 and three capacitors C1, C2 (e.g., C2_1, C2_2, or C2_3), and C3.

Referring to FIGS. 2 and 6B, the first to third sub-pixels SPX1", SPX2", and SPX3" of FIG. 6B, except a third capacitor C3, may be substantially the same as the first to third sub-pixels SPX1, SPX2, and SPX3 of FIG. 2. Therefore, redundant explanations will be omitted.

The third capacitor C3 may be connected between the second node N2 and the second power node ELVSSN. Hence, the second capacitor C2 and the third capacitor C3 may be connected in series between the first power node ELVDDN and the second power node ELVSSN. A common node of the second capacitor C2 and the third capacitor C3 may be connected to one electrode of the first transistor T1, and to one electrode of the sixth transistor T6.

First to third sub-pixels SPX1"', SPX2"', and SPX3"' included in a pixel PXij"' illustrated in FIG. 6C each may include five transistors T1, T2, T3, T4, and T5 and two capacitors C1 and C2 (e.g., C2_1, C2_2, or C2_3).

Referring to FIGS. 2 and 6C, the first to third sub-pixels SPX1"', SPX2"', and SPX3"' of FIG. 6C, except a sixth transistor T6 may be omitted, may be substantially the same as the first to third sub-pixels SPX1, SPX2, and SPX3 of FIG. 2. Therefore, redundant explanations will be omitted.

The first transistor T1 may be connected between the first power node ELVDDN and the second node N2. The first transistor T1 may control driving current flowing from the first power node ELVDDN to the second power node ELVSSN. Here, the first transistor T1 illustrated in FIG. 6C may be directly connected to the anode of the light-emitting element LD1 connected to the second node N2.

Various embodiments of the present disclosure may provide a pixel having improved efficiency, and a display device including the pixel The effects of the present disclosure are not limited by the foregoing, and other various effects are anticipated herein.

Although certain embodiments and implementations have been described herein, other embodiments and modifications will be apparent from the foregoing description. Accordingly, the concepts of the present disclosure are not limited to the foregoing embodiments, but rather to the broader scope of the presented claims and various modifications and equivalent arrangements.

What is claimed is:

1. A pixel comprising a first sub-pixel, a second sub-pixel, and a third sub-pixel, the first, second, and third sub-pixels comprising:
- a first transistor between a first power node and a second node, and comprising a gate electrode connected to a first node;
- a second transistor between a data line and the first node, and comprising a gate electrode connected to a first scan line;
- a third transistor between a reference voltage node and the first node, and comprising a gate electrode connected to a second scan line;
- a fourth transistor between a third node and a first initialization voltage node, and comprising a gate electrode connected to a third scan line;
- a fifth transistor between the first power node and the first transistor, and comprising a gate electrode connected to a first emission control line;
- a sixth transistor between the second node and the third node, and comprising a gate electrode connected to a second emission control line; and
- a first capacitor between the first node and the second node,
- wherein one of reference voltage nodes respectively connected to the first, second, and third sub-pixels is electrically separated from another of the reference voltage nodes.

2. The pixel according to claim 1, wherein the first, second, and third sub-pixels further comprise a seventh transistor between the second node and a second initialization voltage node, and comprising a gate electrode connected to the third scan line.

3. The pixel according to claim 1, wherein the reference voltage nodes are electrically separated from each other, wherein the reference voltage node of the first sub-pixel is configured to receive a first reference voltage, wherein the reference voltage node of the second sub-pixel is configured to receive a second reference voltage that is different from the first reference voltage, and wherein the reference voltage node of the third sub-pixel is configured to receive a third reference voltage that is different from the first reference voltage and from the second reference voltage.

4. The pixel according to claim 3, wherein the first sub-pixel corresponds to red, wherein the second sub-pixel corresponds to green, wherein the third sub-pixel corresponds to blue, and wherein the first reference voltage is higher than the second reference voltage and is higher than the third reference voltage.

5. The pixel according to claim 4, wherein the second reference voltage is higher than the third reference voltage.

6. The pixel according to claim 1, wherein the first, second, and third sub-pixels respectively comprise second capacitors between the second node and the first power node, and having different respective capacitances.

7. The pixel according to claim 6, wherein the reference voltage nodes are configured to receive preset reference voltages respectively corresponding to the respective capacitances of the second capacitors.

8. The pixel according to claim 6, wherein the second capacitor of the first sub-pixel has a first capacitance, wherein the second capacitor of the second sub-pixel has a second capacitance that is greater than the first capacitance, wherein the second capacitor of the third sub-pixel has a third capacitance that is greater than the second capacitance, and wherein the reference voltage node of the second sub-pixel is configured to receive a second reference voltage that is less than a first reference voltage configured to be received by the reference voltage node of the first sub-pixel, and that is less than a third reference voltage configured to be received by the reference voltage node of the third sub-pixel.

9. The pixel according to claim 1, wherein a channel length of the first transistor of the first, second, or third sub-pixels is different from a channel length of the first transistor of another of the first, second, or third sub-pixels.

10. The pixel according to claim 9, wherein the channel length of the first transistor of the first sub-pixel is a first length, wherein the channel length of the first transistor of the second sub-pixel is a second length that is greater than the first length, wherein the channel length of the first transistor of the third sub-pixel is a third length that is less than the second length, and wherein the reference voltage node of the second sub-pixel is configured to receive a second reference voltage that is lower than a first reference voltage configured to be received by the reference voltage node of the first sub-pixel, and that is lower than a third reference voltage configured to be received by the reference voltage node of the third sub-pixel.

11. The pixel according to claim 1, further comprising a third capacitor between the second node and a second power node.

12. A pixel comprising a first sub-pixel, a second sub-pixel, and a third sub-pixel, the first, second, and third sub-pixels comprising:

a first transistor between a first power node and a second node, and comprising a gate electrode connected to a first node;

a second transistor between a data line and the first node, and comprising a gate electrode connected to a first scan line;

a third transistor between a reference voltage node and the first node, and comprising a gate electrode connected to a second scan line;

a fourth transistor between the second node and a first initialization voltage node, and comprising a gate electrode connected to a third scan line;

a fifth transistor between the first power node and the first transistor, and comprising a gate electrode connected to a first emission control line; and a capacitor between the first node and the second node, wherein one of reference voltage nodes respectively connected to the first, second, and third sub-pixels is electrically separated from another one of the reference voltage nodes.

13. A display device, comprising pixels that comprise a first sub-pixel, a second sub-pixel, and a third sub-pixel;

a power driver configured to supply voltages to the pixels;

a data driver configured to supply a data voltage to a data line; and a scan driver configured to supply scan signals to scan lines, wherein the first, second, and third sub-pixels comprise:

a first transistor between a first power node and a second node, and comprising a gate electrode connected to a first node;

a second transistor between the data line and the first node, and comprising a gate electrode connected to a first scan line among the scan lines;

a third transistor between a reference voltage node and the first node, and comprising a gate electrode connected to a second scan line among the scan lines;

a fourth transistor between a third node and a first initialization voltage node, and comprising a gate electrode connected to a third scan line among the scan lines;

a fifth transistor between the first power node and the first transistor, and comprising a gate electrode connected to a first emission control line;

a sixth transistor between the second node and the third node, and comprising a gate electrode connected to a second emission control line; and a capacitor between the first node and the second node, and wherein one of reference voltage nodes respectively connected to the first, second, and third sub-pixels is electrically separated from another of the reference voltage nodes.

14. The display device according to claim 13, wherein the reference voltage nodes are electrically separated from each other, wherein the reference voltage node of the first sub-pixel is configured to receive a first reference voltage, wherein the reference voltage node of the second sub-pixel is configured to receive a second reference voltage that is different from the first reference voltage, and wherein the reference voltage node of the third sub-pixel is configured to receive a third reference voltage that is different from the first reference voltage and the second reference voltage.

15. The display device according to claim 14, wherein the first sub-pixel corresponds to red, wherein the second sub-pixel corresponds to green,
wherein the third sub-pixel corresponds to blue, and
wherein the first reference voltage is higher than the second reference voltage and the third reference voltage.

* * * * *